Patented Jan. 17, 1950

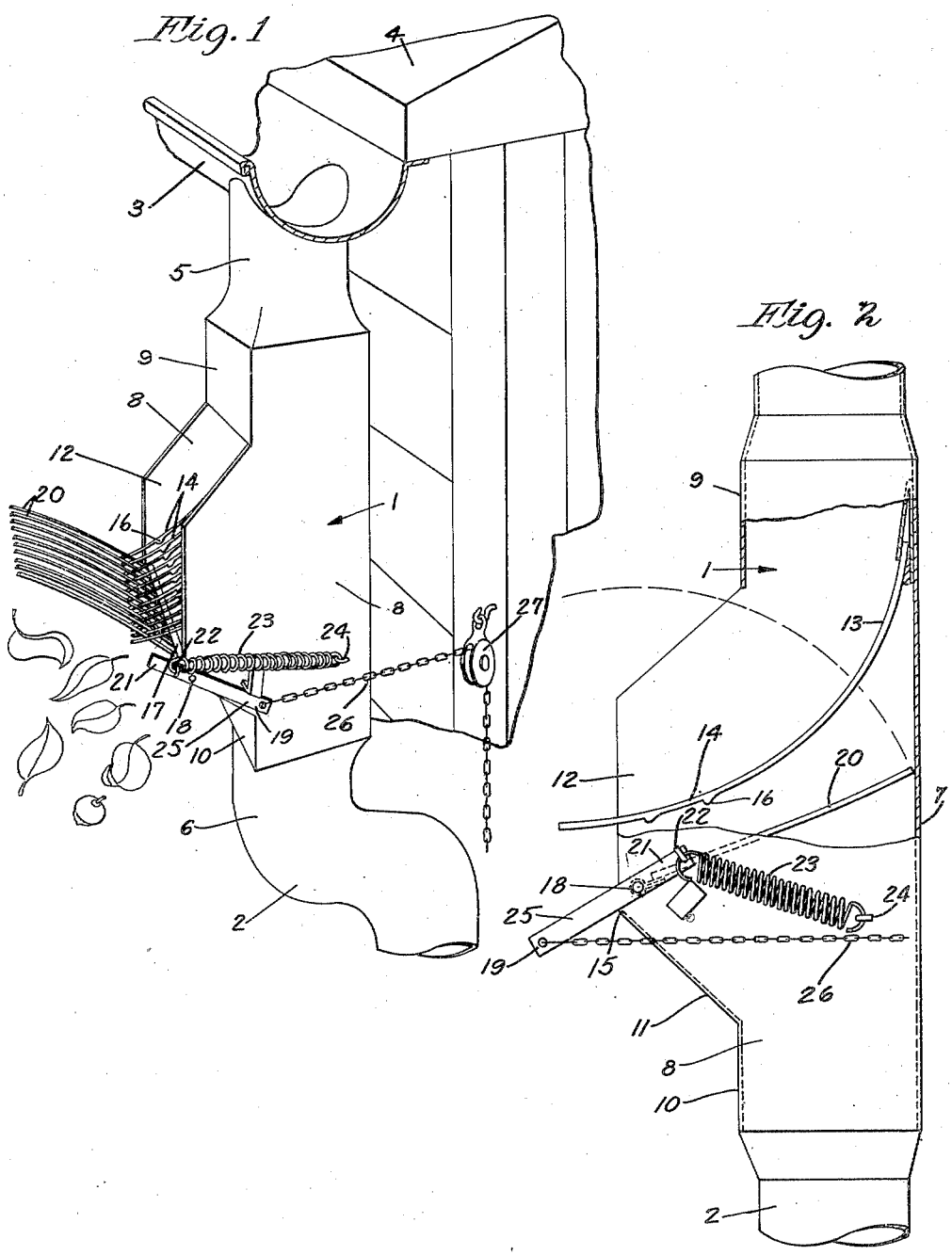

2,494,780

UNITED STATES PATENT OFFICE 2,494,780

DOWNSPOUT STRAINER

William B. Schmidt, Hutchinson, Minn.

Application September 20, 1947, Serial No. 775,337

1 Claim. (Cl. 210—90)

My invention relates to strainers, and more particularly, to strainers in drainpipes leading from eaves troughs or roof gutters for the purpose of removing foreign matter, such as leaves, twigs, and the like, from the drainpipe.

The primary object of my invention is to provide a strainer which will effectively remove such foreign matter without retarding the downflow of water therethrough.

Another object of my invention is to provide a device, as above described, in which, under normal circumstances, foreign matter is removed entirely from the drainpipe through a discharge opening, under action of gravity.

A further object of my invention is the provision of means for cleaning the strainer from a distance remote therefrom when the same becomes clogged under unusual circumstances.

A still further object of my invention is to provide drip-producing means on the strainer for facilitating removal of water therefrom into the drainpipe.

A still further object of my invention is the provision of a strainer, as above described, which is simple and easy to manufacture and install and which needs no attention in operation.

Other objects and advantages of my invention will become apparent from the following specification, appended claim, and attached drawings.

Referring to the drawings, in which like characters indicate like parts throughout the several views:

Fig. 1 is a fragmentary view in perspective, illustrating the use of my improved strainer in a down drain from a roof gutter; and Fig. 2 is a fragmentary view in side elevation, some parts being broken away and some parts shown in section.

Referring in greater detail to the drawings, the numeral 1 indicates, in its entirety, a strainer casing which is interposed in a down drain 2. Down drain 2 is suitably fastened to and has direct communication with an eaves trough or roof gutter 3, which is suitably secured to the lower edge of a roof 4. The casing 1 may be formed integrally with the drainpipe 2 or secured thereto by soldering or the like. The drainpipe 2 forms an inlet 5 and an axially aligned outlet 6 at the top and bottom, respectively, of the casing 1. The casing 1 may be located at any desired point in the down drain 2, but preferably, and as shown, is positioned closely adjacent the eaves trough 3. In any event, the strainer is located between the eaves trough 3 and any elbow or trap which may be included in the strainer system.

The casing 1 is preferably rectangular in form and comprises a rear wall 7, side walls 8, and upper and lower front wall portions 9 and 10 respectively. The side walls 8, at their intermediate portions, project forwardly of the front wall portions 9 and 10. The lower front wall portion 10 is formed to provide a ramp 11, which extends diagonally upwardly and forwardly to the extreme forward edge of the side walls 8. The side walls 8 and the front wall portions 9 and 10 cooperate to define an opening 12 for the discharge of foreign matter, as will be hereinafter more fully described.

A strainer element 13 is made up of a plurality of laterally-spaced parallel rods 14, which at their upper ends are secured by welding or the like to the rear wall 7, directly below the inlet 5. The rods 14 extend downwardly and forwardly within the casing 1 and terminate above the forward edge 15 of the ramp 11. The extreme outer ends of the rods 14 preferably project outwardly beyond the edge 15 of the ramp 11. It will be noted that the rods 14 are formed with a slight arc and the strainer element 13, as thus constructed, provides a relatively smooth and unobstructed slide. Foreign matter, such as leaves, twigs, stones, and the like, which enter the down drain 2 from the eaves trough 3, strike the strainer element 13, and are normally deflected outwardly from the discharge opening 12.

Most of the water passing downwardly through the drain 2 will pass freely through the strainer element 13. However, some water will strike the rods 14 and tend to run downwardly thereon and outwardly of the discharge opening 12. Water is also transferred to the rods 14 from contact with wet debris. To prevent water from running to the extreme outer ends of the rods 14, I have provided drip-producing means in the nature of lugs 16, on the under sides of the rods 14, intermediate their ends. Water running down the rods 14 will tend to accumulate at the lugs 16 and drop from thence into the outlet 6, or to the ramp 11 (see Fig. 2). Thus, substantially all of the flow of water from the eaves trough 3 is retained within the down drain 2, while the foreign matter passes outwardly through the opening 12.

The structure so far described will, as above pointed out, separate foreign matter, such as twigs and leaves, from the water spout. It is, nevertheless, true that, under abnormal circumstances, the strainer element 13 will become clogged; and it is an important object of my invention to provide mechanism for manually unclogging the strainer, even through the strainer may be located remote from the operator. For this purpose, I provide a rock shaft 17, which is pivotally mounted on a horizontal axis within the casing 1 below the rods 14 and preferably closely adjacent the upper edge 15 of ramp 11. Rock shaft 17 has its opposite ends journalled in the opposite sides 8 of casing 1. One end, indicated by numeral 18, extends through the casing and has a crank arm 19 rigidly secured thereto. Secured to rock shaft 17 within the casing 1 in laterally-spaced relation along the length thereof and extending axially therefrom are a plurality of teeth or fingers 20 which are staggered with respect to the rods 14 and which teeth, together with the rock shaft 17, create a comb element for the cleaning of rods 14 when the rock shaft is rotated from the position indicated in Fig. 2 to the position indicated in Fig. 1. It will be there noted that teeth or fingers 20 are of a length to permit their being lowered to a position below the rods 14 when not in use and to be projected outwardly through the opening 12 during the cleaning operation.

To the shorter end 21 or crank arm 19, a hook 22 is secured. A coil spring 23 has its opposite end secured to hook 22 and a hook 24 on the outside of casing 1. Spring element 23 normally biases the rock shaft 17 and teeth 20 to the position of Fig. 2, so as not to impede the normal passage of leaves out through the opening 12.

To the long end 25 of the crank arm 19, a chain or the like 26 is secured. Chain 26 runs over a pulley 27 secured to the side of the structure and from thence to a position close to the ground so that it may be reached by one desiring to unclog the strainer rods 14 by pulling downwardly thereon and moving the rock shaft 17 and fingers 20 to the position indicated in Fig. 1.

My device has been thoroughly tested and found to be entirely satisfactory for accomplishing the objectives heretofore mentioned.

While I have disclosed a preferred embodiment of my device, it will be understood that the same is capable of various modifications without departure from the scope of the invention.

What I claim is:

In a device of the class described, a casing having an inlet and an outlet at its top and bottom respectively, a discharge opening at one side thereof, a plurality of laterally-spaced strainer rods extending diagonally downwardly across said casing and terminating outwardly of said discharge opening and above the bottom thereof, a comb element mounted within the casing below said rods for partial rotation about a horizontal axis extending transversely of said rods, said comb element having teeth which are staggered with respect to the strainer rods, said teeth being of a thickness and longitudinal dimensions to pass upwardly through said strainer rods and outwardly through said discharge opening, and means biasing the teeth of said comb element to a position below said strainer rods.

WILLIAM B. SCHMIDT.

REFERENCES CITED

The following references are of record in the file of this patent:

UNITED STATES PATENTS

| Number | Name | Date |
|---|---|---|
| 174,701 | Parker | Mar. 14, 1876 |
| 441,419 | Jones | Nov. 25, 1890 |
| 571,776 | Long | Nov. 24, 1896 |
| 1,653,473 | Schulz | Dec. 20, 1927 |
| 1,794,504 | Van Norman | Mar. 3, 1931 |
| 2,090,997 | French | Aug. 24, 1937 |